(12) United States Patent
Mehnert et al.

(10) Patent No.: US 10,222,236 B2
(45) Date of Patent: Mar. 5, 2019

(54) MAGNETIC ABSOLUTE POSITION SENSOR HAVING A WIEGAND MODULE

(71) Applicants: Avago Technologies International Sales Pte. Limited, Singapore (SG); Walter Mehnert, Ottobrunn (DE); Thomas Theil, Feldafing (DE)

(72) Inventors: Walter Mehnert, Ottobrun (DE); Thomas Theil, Feldafing (DE)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 150 days.

(21) Appl. No.: 15/278,247

(22) Filed: Sep. 28, 2016

(65) Prior Publication Data
US 2017/0089725 A1    Mar. 30, 2017

(30) Foreign Application Priority Data

Sep. 28, 2015   (DE) .................. 10 2015 218 639
Oct. 7, 2015    (DE) .................. 10 2015 117 080

(51) Int. Cl.
*G01D 5/14*    (2006.01)
*G01D 5/249*   (2006.01)

(52) U.S. Cl.
CPC ............. *G01D 5/142* (2013.01); *G01D 5/145* (2013.01); *G01D 5/2497* (2013.01)

(58) Field of Classification Search
CPC .... G01D 5/145; G01D 5/2454; G01D 5/2455; G01D 5/142; G01D 5/2497; G01D 5/14; G01P 13/04; G01P 3/4815; G01P 3/481; G01P 3/487; G01B 7/30; G01R 1/16; G01R 23/00; G06F 15/00
See application file for complete search history.

(56) References Cited

U.S. PATENT DOCUMENTS

| 2011/0006757 | A1* | 1/2011 | Mehnert | G01D 5/145 324/207.2 |
| 2013/0200883 | A1* | 8/2013 | Mehnert | G01R 33/072 324/207.2 |
| 2014/0067301 | A1 | 3/2014 | Mehnert et al. | |
| 2015/0130450 | A1* | 5/2015 | Gehringer | G01D 5/145 324/207.25 |

* cited by examiner

*Primary Examiner* — Jay Patidar
(74) *Attorney, Agent, or Firm* — Sheridan Ross P.C.

(57) ABSTRACT

The present disclosure relates to an absolute position sensor. In one example, the absolute position sensor includes a Wiegand module and a control electronic that enable the absolute position sensor to operate in either a non-autonomous mode or an autonomous mode. In the autonomous mode there is no external energy available and a position sensor is supplied with energy by the Wiegand module.

9 Claims, 4 Drawing Sheets

MAGNETIC ABSOLUTE POSITION SENSOR HAVING A WIEGAND MODULE

CROSS-REFERENCE TO RELATED APPLICATIONS

The present application claims the priorities of the German patent application no. DE 10 2015 218 639, filed Sep. 28, 2015, and of the German patent application no. DE 10 2015 117 080, filed Oct. 7, 2015, which are both incorporated herein by reference in their entirety.

FIELD OF THE INVENTION

The present invention relates to a magnetic absolute position sensor.

TECHNOLOGICAL BACKGROUND

A magnetic absolute position sensor is known in the state of the art from the document DE 10 2007 039 051 A1.

The sensor described therein is capable to determine, on the one hand, an angular posture of a permanent magnet and, on the other hand, to count a number of turns of the permanent magnet as well as to store a value, which corresponds to the number, in a non-volatile memory. The absolute position of the permanent magnet can be determined from the value, which corresponds to the number, and the actual angular posture.

The known sensor is realized by a utilization of different technologies, namely the CMOS technology and the FRAM technology, which is employed for the non-volatile data memory, in an integrated circuit. The non-volatile data memory is particularly a FRAM data memory because this allows a very high number of storage cycles in contrast to data memories, which are based on other technologies, for example the CMOS technology, and thus ensures a sufficient life time of the sensor in this respect.

The realization of an integrated circuit on the basis of both technologies is however complex and expensive.

The alternative employment of two separated integrated circuits is not always possible, because the data traffic between the two integrated circuits is more complex—and thus slower—and more energy-intensive. For applications without external energy supply, in which a high data traffic must be fast and not sufficient energy is available for the data traffic between two separate integrated circuits, one will thus not be able to dispense with the formation of a single integrated circuit on the basis of two technologies, even if this is more complex and more expensive.

Aggravatingly, it is added that the application possibilities of the FRAM memory is limited in view of its temperature stability, such that in applications involving higher temperatures, the employment of the known sensors is not possible.

SUMMARY OF THE INVENTION

Against this background, there may be a need to provide a position sensor, which has a sufficiently high lifetime and allows a broader spectrum of application possibilities.

This need may be satisfied by a position sensor according to the patent claim 1. Preferred embodiments are subjects of the dependent patent claims.

According to an exemplary embodiment of the invention, and according to an aspect of the invention, a magnetic absolute position sensor comprises: (I) a Wiegand module, which is composed of a Wiegand wire with a coil, which surrounds the Wiegand wire; (II) a measurement substrate, which defines a measurement plane, and which comprises a plurality of Hall elements, wherein the Hall elements are arranged on the measurement substrate such that their active areas, which are sensitive to a magnetic field, extend in the measurement plane and/or form a part of the measurement plane; (III) a permanent magnet arrangement, which is movable in a movement plane, which is parallel to the measurement plane, relative to the Wiegand module and to the measurement substrate in one direction as well as in a direction that is opposite to said one direction, wherein upon a movement of the permanent magnet arrangement in said one direction, the coil of the Wiegand module outputs a voltage pulse, if a north pole or a south pole of the permanent magnet arrangement is located at a first position, and upon a movement of the permanent magnet arrangement in said opposite direction, the coil of the Wiegand module outputs the voltage pulse, if the north pole or the south pole of the permanent magnet arrangement is located at a second position that is different from the first position.

The alignment of the measurement substrate and the areas of the Hall elements, which are sensitive to a magnetic field, may have to be seen mathematically. Two vectors having the same origin may span the measurement plane. A plane, which may be spanned by circumferential edges, which respectively may point in two different directions, of the areas of the Hall elements, which are sensitive to a magnetic field, maybe identical to the measurement plane. That is, all the areas of the Hall elements, which are sensitive to a magnetic field, may extend in the measurement plane and/or may form a part of the measurement plane. Likewise, a substrate surface, on which the Hall elements may be are arranged, may be at least parallel to the measurement plane.

By the relative movement of the permanent magnet arrangement with respect to the Wiegand module, there may result a change of the magnetic field of the permanent magnet arrangement, which may be experienced by the Wiegand module. The Wiegand wire, preferably manufactured from Vicalloy, may in particular be composed of a magnetically hard shell (or lining) and a magnetically soft core and can be "preloaded" by certain movement sequences of the permanent magnet arrangement. Due to this construction and the physical characteristics that goes along therewith of the Wiegand module and/or the Wiegand wire, an abrupt change of the orientation of the Weiss domains of the Wiegand wire may be effected as from a specific amplitude of the magnetic field, which may be reached at about 135° rotation of the magnetic field. This change in turn may lead to the generation of the voltage pulse in the coil of the Wiegand module. As a function of in which direction the permanent magnet arrangement moves, i.e. in said one direction or in the direction that is opposite to said one direction, the north pole or the south pole of the permanent magnet arrangement may be located at the mentioned first or second position.

The position sensor according to the invention further comprises (IV) a micro-controller; and (V) a processing electronic system, which is arranged on the measurement substrate and which comprises a control electronic, a volatile data memory and a non-volatile data memory as well as the Hall elements, which are realized on the measurement substrate in a common integrated circuit on the basis of identical integration technology; wherein the control electronic is configured, (i) in a non-autonomous mode, in which the position sensor is supplied with external energy, to deliver output signals of a group of the Hall elements to the micro-controller for determining a precise posture of the permanent magnet arrangement with respect to a reference posture and to determine a value, which corresponds to a number of repeating motion sequences of the permanent magnet arrangement, for storing in the volatile and/or the non-volatile data memory either on the basis of an output signal of at least one of the Hall elements or to obtain such a value from the micro-controller; and (ii) in an autonomous mode, in which no external energy is available and the position sensor is supplied with energy, which is provided by the Wiegand module, to determine the value, which corresponds to the number of repeating motion sequences of the permanent magnet arrangement, on the basis of an output signal of at least one of the Hall elements as well as to store the value in the volatile data memory and to transfer the value, which is stored in the volatile data memory, to the non-volatile data memory, if the energy, which is available in the autonomous mode, falls below a threshold value.

The repeating motion sequences of the permanent magnet arrangement may concern either a rotation or a linear displacement. Insofar, the position sensor according to the invention may be implemented such that it may determine the value, which may indicate the number of turns (or revolutions) or linear displacements of the permanent magnet arrangement.

The position sensor according to the invention may thus be considered as an absolute position sensor, because it may be capable to further determine the value of this number even in the case of a breakdown (or discontinuation) of the external energy supply in the autonomous mode and, after the external supply is available again, to determine the absolute position of the permanent magnet arrangement from said value of the number and the current determined precise posture of the permanent magnet arrangement with respect to the reference posture. The stored value, which may indicate the number of repeating motion sequences of the permanent magnet arrangement, may either be a value, which may indicate the amount of the number of repeating motion sequences, i.e. which does not take into account the change of the movement direction of the permanent magnet arrangement, or [may be] a value, which may take into account the change of the movement direction of the permanent magnet arrangement.

Due to the implementation according to the invention, according to which the volatile and the non-volatile data memory as well as the control electronic and the Hall elements may be realized in a unitary integration technology in a common integrated circuit, and according to which due to a cooperation of the data memory and the control electronic, the number of write cycles of individual memory cells of the non-volatile data memory may reduce strongly, the following advantages may result:

The data memories may, on the one hand, be realized together without problems and cost-efficiently and, on the other hand, an integration technology, which may be optimum for a particular application, may be selected flexibly, without being limited by, for example, limited numbers of possible memory cycles and temperature requirements.

The realization of an integrated circuit, in which at least both data memories and the control electronic may be realized, may also result in an energy-saving and faster operation of the position sensor and hereby not at least in that the energy supply in the autonomous mode may be taken over safely by the Wiegand module.

The Hall elements of the position sensor according to the invention may preferably be also based on the integration technology, in which the processing electronic system as well as both data memories may be realized.

The energy, which may be provided by the Wiegand module in the autonomous mode, may preferably be stored intermediately (or temporarily) in an energy storage, for example a capacitor, because the voltage pulse, which may be provided by the Wiegand module, may last only about 20 µs. The energy storage in turn may supply the processing electronic system with the correspondingly stored energy. The point in time, when the value, which may be stored in the volatile data memory, must be transferred to the non-volatile data memory, may depend on the possible duration of supply of the processing electronic system by the energy storage and/or the capacitor and thus both from the energy provided by the Wiegand module and the total energy consumption of the position sensor. As long as the energy, which may be stored in the energy storage and/or capacitor, and which may be characterized by a specific voltage value of the voltage of the energy storage, may be sufficient to transfer the stored value from the volatile data memory to the non-volatile data memory, the value, which may reflect the number of repeating motion sequences, may be changed, i.e. increased or reduced, only in the volatile data memory. The non-volatile data memory may remain untouched as long as the energy, which may be stored in the energy storage and/or capacitor, is sufficient.

The monitoring as to whether the energy, which is stored/contained in the energy storage, falls below the threshold value, may be effected directly by measuring a voltage of the capacitor, which may be supplied and/or charged by the Wiegand module, or by determining, whether a time duration after the occurrence of the voltage pulse exceeds a time period limit.

If the magnetic position sensor is in an operational state, in which each value of the number of repeating motion sequences, which may be determined by the processing electronic system, may have to be stored in the non-volatile data memory, the storing process may be effected in the non-volatile data memory either indirectly via the volatile data memory or directly.

The at least one Hall element, on the basis of the output signals of which the number of repeating motion sequences are determined, may be arranged preferably such that in the case of a movement of the permanent magnet arrangement in said one direction or in the direction that is opposite thereto after the determination of the voltage pulse and in this case of the presence of sufficient energy, may output an output signal, which may indicate the north pole or the south pole of the permanent magnet arrangement, and upon a movement of the permanent magnet arrangement in the respective other direction after the determination of the voltage pulse and in this case of the presence of sufficient energy, may output no output signal. Upon a movement of the permanent magnet arrangement in the direction, in which the Hall element provides no output signal during the voltage pulse, the information about whether the north pole or the south pole is located at the respective position, may be gained from the polarity of the voltage pulse.

Furthermore it may be possible to determine the number of repeating motion sequences from the output signals of plural Hall elements, which may be arranged offset to each other in the movement direction of the permanent magnet arrangement.

In addition, each of the Hall elements may also be paired with a respective other Hall element, wherein the output signals of the paired Hall elements may be evaluated jointly according to the difference principle for eliminating noise fields (or interference fields).

For the determination of the number of repeating motion sequences, the processing electronic system may comprise, for example, a comparator for the comparison of a voltage threshold with a voltage that may be output from the Hall element/the Hall elements.

Preferably, the control electronic may take over also the energy management of the processing electronic system and for this purpose may comprise, for example, a rectifier for rectifying the voltage pulse, which may be output from the Wiegand module.

The identical integration technology may preferably be a CMOS integration technology, wherein the volatile data memory may be, for example, a register and the non-volatile data memory may be, for example, an EEPROM.

The processing electronic system, in particular the data memories, may be configured such that they can be operated at or above 160° C., wherein the non-volatile data memory may particularly be formed such that it may allow $10^9$ memory cycles and may hold the memory value even at such temperatures.

It may also be preferable for the CMOS integration technology, that leakage currents, which occur, are extremely low.

Preferably, the volatile data memory may comprise n bits, and the non-volatile data memory may comprise m memory blocks each having at least n bits. The processing electronic system, in particular the control logic, may preferably be configured to transfer the stored value from the volatile data memory to one of the m memory blocks and—if needed—to change said one of the m memory blocks.

The volatile data memory may preferably be implemented such that the number of bits lies between $n>=40$ and $n<=100$, and the non-volatile data memory comprises between $m>=100$ and $m<=1000$ memory blocks.

The processing electronic system, in particular the control electronics, may further preferably be configured to transfer the stored value from the volatile data memory to one of the m memory blocks so long, until an examination of the one of the m memory blocks yields that at least one of the memory cells, which corresponds to the n bits, of the memory block has a malfunction, which for example results in that the memory cell can no longer be written into, and subsequently to change over said one of the m memory blocks.

This implementation of the position sensor according to the invention, namely to be able to change over the memory blocks, may result particularly in that the number of the possible memory cycles is strongly increased and that also non-volatile memories can be employed, which may be based on the same integration technology, for example the CMOS technology, as the volatile data memory.

Further preferably, the processing electronic system, in particular the control electronic, may in this respect be alternatively configured to perform an examination of said one the m memory blocks to the extent whether at least one of the memory cell, which corresponds to one of the n bits, of said one of the m memory blocks has a malfunction, and to subsequently replace the memory cell, which has the malfunction, by a reserve memory cell of the one of the m memory blocks, and to change over said one of the m memory blocks, if a specified number of memory cells of the memory block has the malfunction.

Each of the m memory blocks may include at least n bits, wherein one memory cell may be associated to each bit. Preferably, each of the m memory blocks may include a plurality of reserve memory cells, wherein the processing electronic system may be configured, in the case of a malfunction of a memory cell, to replace this by a reserve memory cell and/or to assign the reserve memory cell to the corresponding bit. Only if a [e.g. specified] number of memory cells of the corresponding memory blocks has a malfunction and has been replaced by the corresponding reserve memory cells, the total memory block may be changed over and/or replaced by another one of the m memory blocks.

By this, it may be achieved, that in the case of a single malfunction of one single memory cell of the memory block, the total memory block may not already be changed over, but only then, if a number of memory cells has a malfunction and has been replaced by corresponding reserve memory cells. In particular, by this implementation, the number of possible memory cycles and/or write cycles can be further increased.

Still further preferred, the processing electronic system, in particular the control electronic, may be configured, in the autonomous mode, to recognize a presence and absence of the voltage pulse of the Wiegand module and to switch on at least those electronics elements, which may be necessary for the determination and storing of the value, which may correspond to the number of repeating motion sequences, only in the case of a presence of the voltage pulse.

For the recognition of the voltage pulse, the processing electronic system may preferably include a comparator, which may be connected directly to the output of the coil and is interconnected (or connected up), such that it may be capable to compare the output signal of the coil of the Wiegand module with a reference value and/or threshold value.

The electronics elements, which may be necessary for the determination and storage of the value, may concern all elements, except for the comparator conceived for the recognition of the voltage pulse, and [further concern] those parts of the control electronic, which may be conceived for the evaluation of the output signal of the comparator. For example, also the Hall elements may be counted among these.

Further preferred, the processing electronic system, in particular the control electronic, may be configured to switch off again the electronic systems after the storing of the value, which may correspond to the number of repeating motion sequences.

Further preferred, the control electronic system, in particular the control electronic, may be configured to transfer the value, which may be stored in the volatile data memory to the non-volatile data memory, if a time duration exceeds a time duration limit after the occurrence of the voltage pulse.

This time duration limit may be dependent of the total energy consumption of the position sensor in the autonomous mode. The position sensor according to the invention may be designed in particular by the invention such that the time duration limit may be between 5 ms and 10 ms.

BRIEF DESCRIPTION OF THE DRAWINGS

In the following, preferred embodiments of the invention are explained with reference to the appended figures.

DETAILED DESCRIPTION OF EXEMPLARY EMBODIMENTS

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Figure 1:
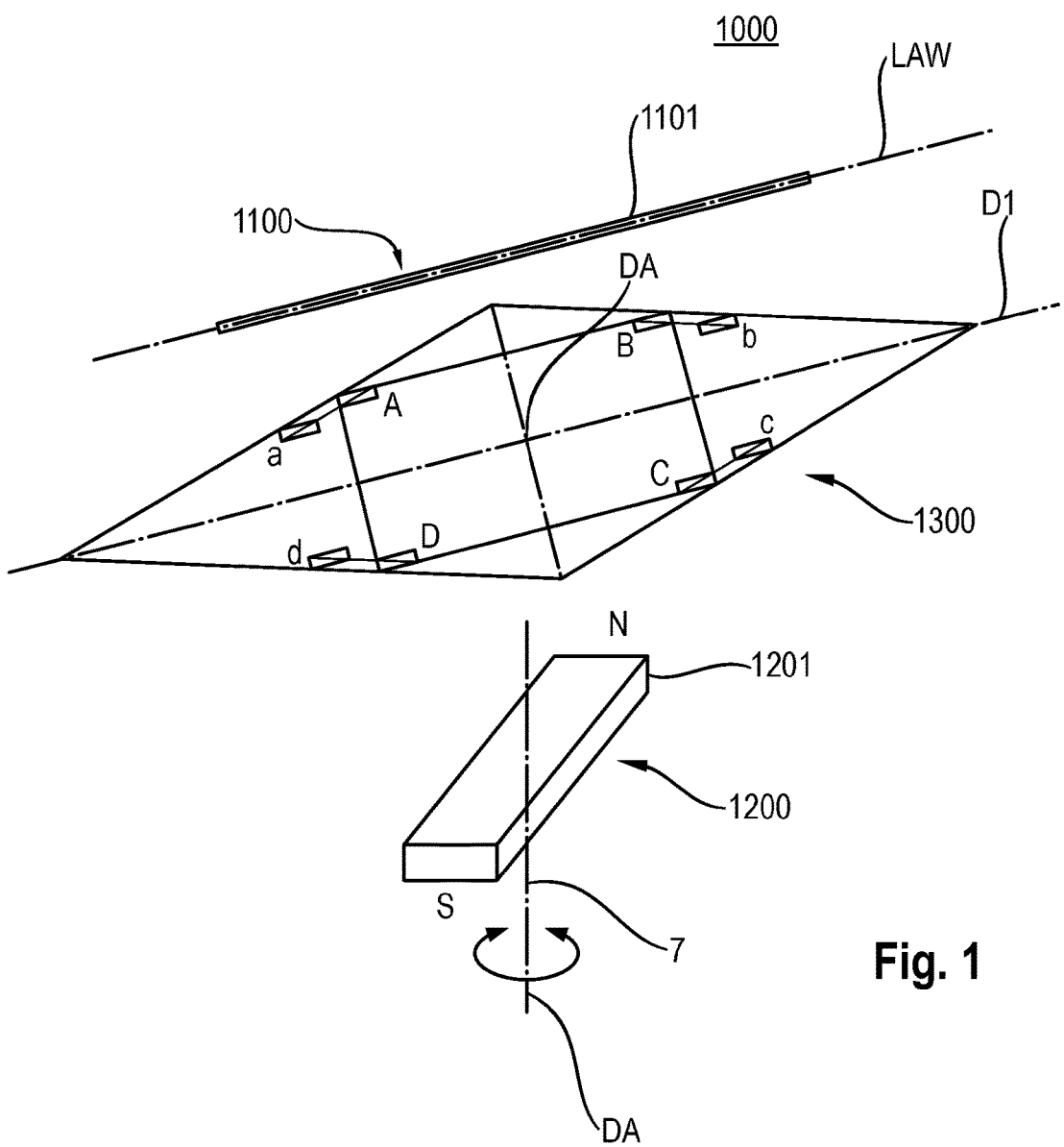
FIG. 1 illustrates a perspective view of an absolute position sensor according to the invention, wherein the position sensor is implemented such that it is capable to detect an absolute position of a rotating permanent magnet, according to a first preferred embodiment of the invention.

FIG. 1 illustrates a perspective view of a first preferred embodiment of a position sensor 1000 according to the invention.

The position sensor 1000 may comprise a Wiegand module 1100, which may comprise, on the one hand, a Wiegand wire 1101 and, on the other hand, a coil (not illustrated) that may extend and/or may be wound around the Wiegand wire 1101, and a permanent magnet arrangement 1200, which may be composed of a rectangular (or box-shaped) permanent magnet 1201 in this first preferred embodiment. The permanent magnet 1201 may also be cylinder-shaped or have any other regular shape.

The permanent magnet arrangement 1200 may be pivot-mounted (or supported rotatably) such that a north pole N and a south pole S of the permanent magnet arrangement 1200 can rotate about a rotation axis DA. The rotation direction may be effected either in one direction, for example the clockwise direction, or in a direction that is opposite to said one direction, the counter-clockwise direction. For an intended use of the position sensor 1000, the permanent magnet arrangement 1200 may be attached to a rotating object to be monitored such that the rotation axis DA of the permanent magnet arrangement 1200 may correspond to the rotation axis of the object, and thus such that the permanent magnet arrangement 1200 may rotate together with the object to be monitored.

The Wiegand wire 1101 may be composed of a magnetically soft core and a magnetically hard shell (or lining). Upon a rotation of the permanent magnet arrangement 1200, the domains and/or the Weiss domains of the Wiegand wire 1101 may abruptly change their orientation as from a specified change and/or rotation of the magnetic field, whereby as a consequence of this, a voltage pulse results, which may be generated by the coil that is wound around the Wiegand wire 1101. Due to the formation of the Wiegand wire 1101 from magnetically soft and magnetically hard sections (core and shell), the abrupt change of the orientation of the domains may occur as a function of the rotation direction of the permanent magnet arrangement 1200 in different postures of the permanent magnet arrangement 1200.

If the permanent magnet arrangement 1200, starting from a posture, in which the longitudinal axis of the rectangular permanent magnet is oriented parallel to a longitudinal axis LAW of the Wiegand module 1100, rotates for example in the clockwise direction, the abrupt change of the orientation of the domains may result after the rotation of the rectangular permanent magnet 1201 by approximately 135°. In this posture of the permanent magnet 1201, either the corresponding north pole N or the south pole S may be located at a first position.

If, on the contrary, the permanent magnet arrangement 1200, starting from the explained starting position, rotates in the counter-clockwise direction, the abrupt change of the orientation of the domains may result again after the rotation of the rectangular permanent magnet 1201 about approximately 135°, wherein in this posture of the permanent magnet 1201 the north pole N or the south pole S may be located at a second position, which is different from the first position.

The inventive position sensor 1000 according to the first preferred embodiment of the invention may comprise, besides the Wiegand module 1100 and the permanent magnet arrangement 1200, also a measurement substrate 1300, which may preferably have a square shape. As can be seen from FIG. 1, the measurement substrate 1300 may be located between the Wiegand module 1100 and the permanent magnet arrangement 1200, wherein the measurement substrate 1300 may run in a measurement plane, which may extend parallel to the movement plane, in which the rectangular permanent magnet 1201 may rotate and/or which may be perpendicular to the rotation axis.

A plurality of Hall elements A to D and a to d may be arranged on the measurement substrate 1300. The plurality of Hall elements is visible well both in the perspective view according to FIG. 1 and also in the plan view of the measurement substrate 1300 in FIG. 2. FIG. 2 corresponds to a plan view of the measurement substrate 1300 perpendicular to the rotation axis DA, which may pierce the measurement substrate 1300 at the center point thereof.

All Hall elements may be arranged such that their active areas, which are sensitive to a magnetic field, extend in the measurement plane.

Each of the Hall elements A to D may be located, respectively, both at an outer edge of the measurement substrate 1300 and also at a center of an edge of the corresponding outer edge of the measurement substrate 1300.

In addition, the Hall elements A to D, which may be formed quadrangular, may be arranged at the center of the edge also in a rotated manner such that a diagonal, which connects two corners of the respective Hall elements, may be perpendicular to the corresponding outer edge. This arrangement of the Hall elements may be selected in particular for the reason that the mechanical tensions are very low at these positions, in particular much lower than at the corresponding corners of the quadrangular measurement substrate 1300.

The Hall elements A to D each may have four contacts, wherein two of the contacts may form the current contacts and the other two contacts may form the Hall voltage contacts of the respective Hall elements.

Alternatively, the Hall elements may also be octagonal (or eight-sided) Hall elements, which may comprise eight contacts each, wherein in this case again, a diagonal, which connects two opposing corners of the respective octagonal Hall element, may be perpendicular to the corresponding outer edge. In this case, respectively two opposing contacts may form the current contacts and the respective two contacts, which may be orthogonal to the current contacts, may form the Hall voltage contacts.

The four Hall elements A to D may be operated in particular in a non-autonomous mode of the position sensor 1000, in which the position sensor 1000 may be supplied with external energy, and their output signals may be output to a micro-controller 3100, which will be explained in the following and which may be capable to calculate from these the precise angular posture of the permanent magnet arrangement 1200 and/or of the object with respect to a reference posture. Insofar, the four Hall elements A to D may be used for a fine resolution.

In the mentioned non-autonomous mode, the value, which may reflect the number of turns of the permanent magnet arrangement 1200, may be determined, too.

In order to eliminate noise fields (or interference fields) and noise variables in the output signals, the corresponding output signals of the Hall elements A to D may be evaluated pair-wisely according to the difference principle. In this context, the output signals of the Hall elements A and C may be evaluated such that the portions of the output signals, which are based on magnetic field components, which are oriented opposite to each other and permeate the Hall elements A and C, may add [to each other], whereas portions of the output signals, which are based on magnetic field components, which are equally oriented and permeate the Hall elements A and C, may subtract and thus may cancel each other. The output signals of the two other Hall elements B and D may be evaluated likewise.

Besides the Hall elements A to D, which have been explained already, also four additional Hall elements a to d, which may be arranged slightly offset to the Hall elements A to D, may also be arranged on the measurement substrate. Because the output signals of these additional Hall elements a to d may be only compared with a voltage threshold, they may be implemented/constructed such that they require significantly less charge than the Hall elements A to D. The four additional Hall elements a to d may span, for example, a virtual rectangle, which may be arranged with respect to the virtual square that is spanned by the Hall elements A to D such that the diagonals of the measurement substrate 1300 intersect the respective edges of the virtual square and of the virtual rectangle in the center points thereof.

The additional Hall elements a to d may be required, in particular in an autonomous mode, in which the position sensor 1000 may not be supplied with external energy, for the determination of the value, which may reflect the number of rotations and/or turns of the permanent magnet arrangement 1200. However, the output signals of the Hall elements a to d may also be used in the non-autonomous mode for the determination of the number of rotations and/or turns of the permanent magnet arrangement.

The output signals of the additional Hall elements a to d may be evaluated preferably pair-wisely according to the difference principle, like for the other Hall elements A to D.

Figures 2A, 2B:
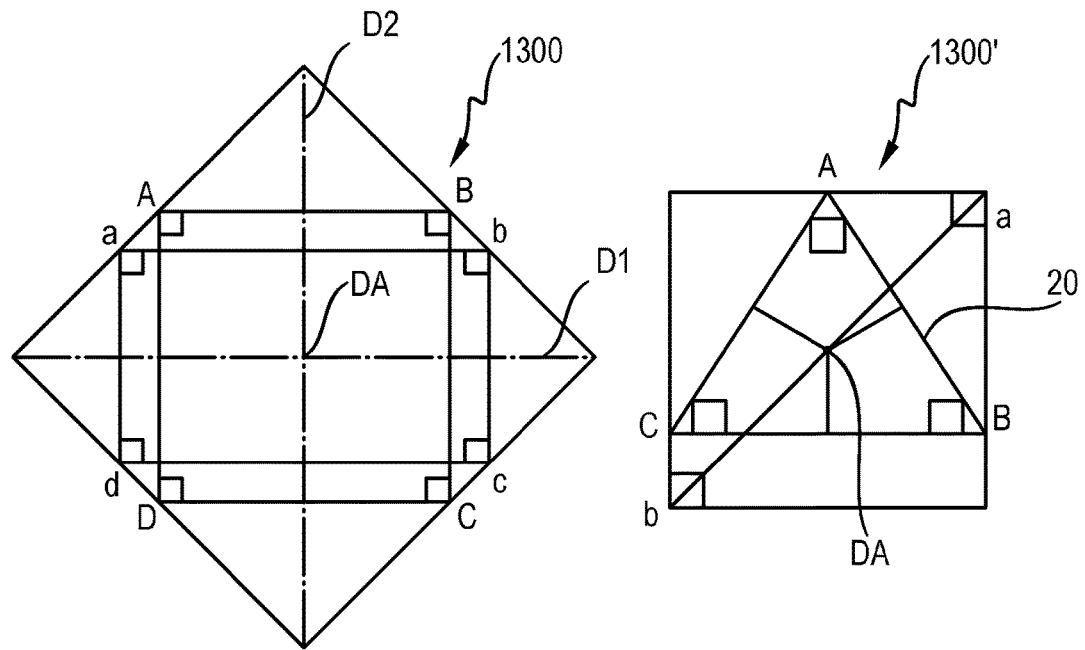
FIGS. 2A and 2B illustrate preferred variants of a measurement substrate, which can be applied in the position sensor according to the first preferred embodiment.

In FIG. 2A, the horizontal diagonal D1 of the measurement substrate 1300 may correspond to the alignment of the longitudinal axis LAW of the Wiegand module 1100. When the permanent magnet 1201 of the permanent magnet arrangement 1200 rotates about the rotation axis DA in the clockwise direction, as has been explained in the preceding, there may result an abrupt change of the domains of the Wiegand wire 1101, when the north pole N or the south pole S is located at the explained first position.

As can be seen in the FIGS. 1 and 2, the first position may correspond in the measurement plane approximately to the position of the Hall element B. Stated otherwise, the first position and that of the Hall element B may be located one after the other and/or one on top of the other in the direction of the rotation axis DA.

The Wiegand wire 1101 may be formed from the magnetically soft and the magnetically hard sections also such that the mentioned first position, at which the north pole N or the south pole S of the permanent magnet arrangement 1200 may be located at the triggering of the voltage pulse, may correspond to the position of the Hall element b in the measurement plane. Stated otherwise, the north pole N or the south pole S of the permanent magnet 1201 may be located in the first position above the Hall element b.

When the permanent magnet arrangement 1200 is arranged in the posture in which one of the poles is located at the first position, the respective other magnetic pole may be in the same spatial relationship to the Hall element d. In this posture, the magnetic field, which may be generated by the permanent magnet arrangement 1200, may permeate the active areas of the Hall elements b and d, which are sensitive to a magnetic field respectively in opposite direction, such that the output signals, which may be evaluated according to the difference principle, may add [to each other].

In this posture, the other pair of Hall elements a and c may hardly experience the magnetic field of the permanent magnet arrangement 1200 due to their spatial offset, which may be why the output signals thereof (already due to the difference principle) may strive against zero, when the north pole N or the south pole S of the permanent magnet arrangement 1200 is located at the first position and the coil of the Wiegand module 1100 outputs the voltage pulse.

Upon a movement of the permanent magnet arrangement 1200 in the opposite direction, i.e. upon a rotation of the rectangular magnet 1201 in the counter-clockwise direction, an abrupt change of the alignment of the domains of the Wiegand wire 1101 may result in an equivalent manner, when the north pole N or the south pole S of the permanent magnet arrangement 1200 is located at a second position that is different from said first position.

The second position may correspond either to the Hall element c or C, depending on the implementation of the Wiegand wire 1101. When the north pole N or the south pole S is located at the second position, the respective other magnetic pole may be in the same spatial relationship to the Hall element A or a. The output signals of the Hall elements a and c may be evaluated in the same manner as those of the Hall elements b and d.

As a function of in which direction the permanent magnet arrangement 1200 rotates, the inference as to whether the permanent magnet arrangement 1200 rotates in the one direction—the clockwise direction—or in the direction that is opposite to said one direction—the counter-clockwise direction—can be drawn in the normal case from the output signals of the pairs of the Hall elements a, c and b and d.

Furthermore, it can be determined from the polarity of the output signals of the Hall elements a, c and b, d, whether the north pole N or the south pole S is located at the first or at the second position. Insofar, the resolution of the absolute position sensor 1000 according to the invention may be one half turn in the autonomous mode.

Theoretically, the number of the additional Hall elements a to d can be reduced. For example, one of the pairs of Hall elements a, c and b, d could be omitted. The inference as to the rotation direction of the permanent magnet arrangement 1200 can be drawn from the output signals of the remaining pair of Hall elements after the determination/detection of the voltage pulse of the Wiegand module 1100. Namely, if the pair of Hall elements provides no output signals upon/after detection of the voltage pulse, one can proceed from the assumption, that the permanent magnet arrangement 1200 rotates in the direction, for which no pair of Hall elements is conceived. The information about how the polarities of the permanent magnets 1201 are aligned in this state can be determined from the polarity of the voltage pulse of the Wiegand module.

In contrast to this, if the pair of Hall elements provides output signals, one can proceed from the assumption that the permanent magnet arrangement 1200 rotates in the corresponding direction.

Furthermore, if the absolute position sensor 1100 according to the invention is used in an environment, in which no magnetic noise fields occur, the number of additional Hall elements a to d can be reduced to one single Hall element. In the autonomous mode, the rotation direction can thus be determined on the basis of an output signal of at least one single Hall element.

FIG. 2B illustrates an alternative implementation of a measurement substrate 1300', which can be applied in the absolute position sensor 1000 according to the invention.

The measurement substrate 1300' may differ from that of FIG. 2A in that only three Hall elements A to C may be conceived for the precise determination of the angular position of the permanent magnet arrangement 1200, i.e. for the fine resolution, and only two Hall elements a, b may be conceived for the determination of the value, which may indicate the number of turns of the permanent magnet arrangement 1200.

The Hall elements A to C may span a virtual equilateral triangle, wherein the Hall element A may be arranged at the respective upper edge of the measurement substrate 1300' shown in FIG. 2B and the corresponding center of the edge.

The center of area of the equilateral triangle may be identical with the center point of the square-shaped measurement substrate 1300'.

The additional Hall elements a, b may be located at the corners of the measurement substrate 1300' on the corresponding diagonal. The output signals of the additional Hall elements a, b may be evaluated according to the difference method, which has been explained already.

Figure 3:
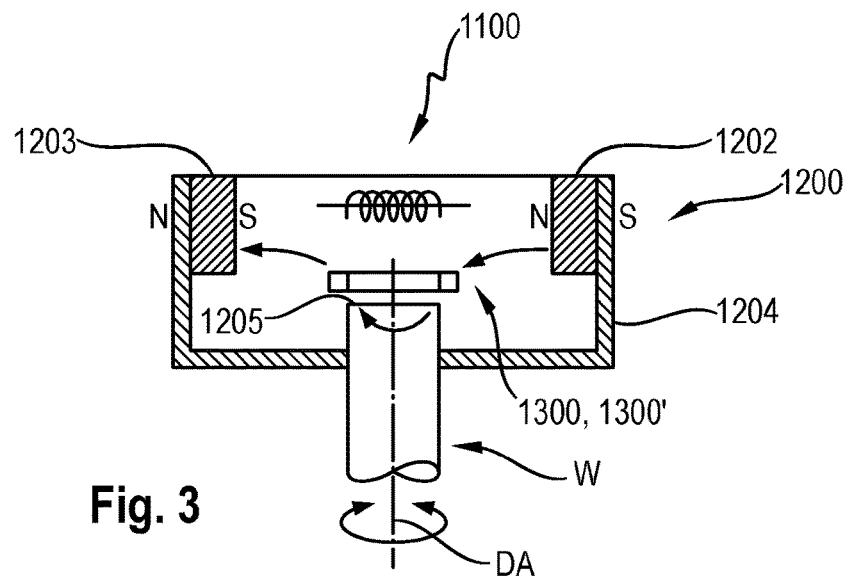
FIG. 3 illustrates a preferred implementation of the absolute position sensor according to the first preferred embodiment, wherein the position sensor is arranged at a shaft to be monitored and comprises a plurality of permanent magnets, which are attached to a back iron body, which rotates with the shaft.

FIG. 3 illustrates a preferred implementation of the inventive position sensor according to the first preferred embodiment. This implementation satisfies highest precision requirements.

In the shown implementation, the position sensor 1000 may be employed for monitoring the absolute posture of a shaft W. The measurement substrate 1300, 1300' may be arranged at the face side of the shaft W, wherein the Wiegand module 1100 may be arranged on the side of the measurement substrate 1300, 1300', which may be facing away from the face side. The measurement substrate may concern either that shown in FIG. 2A or that in FIG. 2B.

In this implementation, the permanent magnet arrangement 1200 may comprise not only a single permanent magnet, but two permanent magnets 1202, 1203, which may respectively be attached to a back iron body 1204 of the permanent magnet arrangement 1200.

The back iron body 1204 may further be connected to the shaft W such that it may rotate around the rotation axis DA together with the shaft W, wherein this rotation may result in a relative movement between the back iron body 1204/permanent magnets 1202, 1203 and the Wiegand module 1100 or the measurement substrate 1300, 1300'.

The permanent magnets 1202, 1203 may be attached to the back iron body 1204 such that their axes which connect the corresponding north pole and south pole, may extend perpendicular to the rotation axis DA and that opposite poles may be facing each other; in FIG. 3, the right permanent magnet 1202 may be arranged such that the north pole N thereof points in the direction of the rotation axis DA, whereas the permanent magnet 1203 may be arranged such that the south pole S thereof points in the direction of the rotation axis DA.

The shaft W and/or the face side thereof may preferably be formed from a ferromagnetic material, which may be why it may act as a field concentrator in this implementation. In the case, where a shaft W is to be monitored, which is not formed from a ferromagnetic material, the back iron body 1204 can alternatively be implemented such that, on the one hand, it is attached to the face side of the shaft W and, on the other hand, has an elevation/a projection in the direction of the measurement substrate 1300, 1300' and may take over the function of the field concentrator due to its formation from a ferromagnetic material.

The shaft W, which may act as the field concentrator, may cause the field components of the magnetic field that may extend perpendicular to the rotation axis DA may be deflected in the direction to the face side of the shaft and permeate at least partially perpendicularly the measurement substrate 1300, 1300' in the region of the plurality of Hall elements A to D and a to d and/or A to C and a, b. In detail, the magnetic field shown in FIG. 3 may run from the right permanent magnet 1202 in the direction to the other permanent magnet 1203, wherein the magnetic field components that are facing the face side of the shaft may be deflected and thereby may permeate the measurement substrate 1300, 1300' for a first time, may pass through the shaft and exit from the shaft such that they may permeate the measurement substrate 1300, 1300' for a second time, and may further run in the direction to the second permanent magnet 1203. As becomes understandable from this, the Hall elements A, C and/or B, D and [the elements] a, c and/or b, d, which may form respective pairs, may be permeated by magnetic field components that may be directed opposite to each other, which may result in output signals that add to each other according to the difference principle.

Because in this implementation of the position sensor 1000 the field concentrator may rotate together with the permanent magnets 1202, 1203, no hysteresis jumps, which may reduce the precision, may occur in the output signals of the Hall elements.

Figure 4:
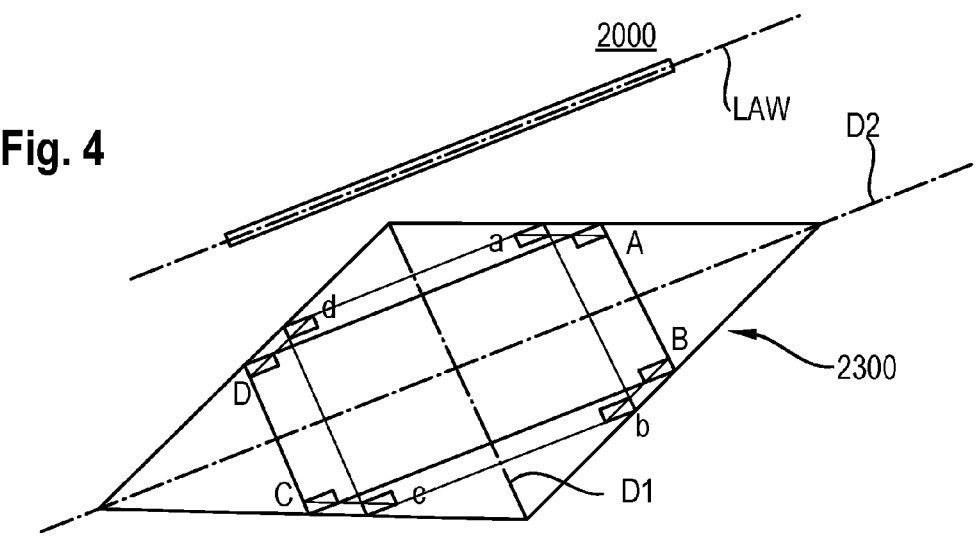
FIG. 4 illustrates an absolute position sensor, wherein the position sensor is implemented to determine a linear displacement of a permanent magnet arrangement constructed of two permanent magnets, according to a second preferred embodiment of the invention.
Figure 4:
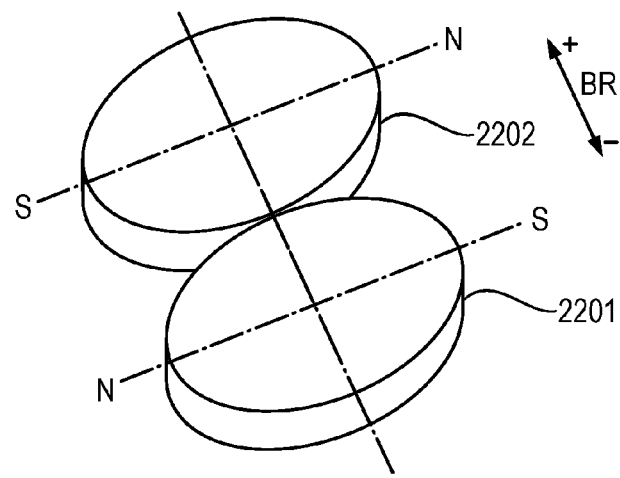

FIG. 4 shows a second preferred embodiment of an absolute position sensor 2000 according to the invention. The difference to the position sensor 1000 of the first preferred embodiment may consist in that the position sensor 2000 according to the second preferred embodiment cannot detect rotations, but rather linear displacements.

The position sensor 2000 may comprise a Wiegand module 1100, which may be identical to that of the first preferred embodiment, which is why reference is made to corresponding explanations.

Furthermore, the position sensor 2000 may also comprise a permanent magnet arrangement 2200, which may be composed of two cylinder-shaped permanent magnets 2201, 2202 in this embodiment. However, the permanent magnets 2201, 2202 may also have other shapes.

According to intended use, the permanent magnet arrangement 2200 may be linearly displaced along the shown movement direction BR. Hereby, the movement may be effected in said one direction (positive movement direction BR) or in the direction that is opposite to this (negative movement direction BR). The permanent magnets 2201, 2202 may be polarized opposite to each other and may be aligned such that their north pole-south pole-axes are aligned perpendicular to the movement direction BR.

The position sensor 2000 may also comprise a measurement substrate 2300, on which a plurality of Hall elements and a processing electronic system may be arranged, too.

The measurement plane, in which the measurement substrate 2300 runs, and the movement plane, in which the permanent magnet arrangement 2200 moves, may extend parallel to each other again.

The measurement substrate 2300 may be identical to that of the first embodiment, except for the difference, that not the output signals of the Hall elements, which may be located on the diagonals of the virtual square and/or rectangular, may be evaluated jointly, but rather those of the Hall elements, which may be located on one side of the measurement substrate 2300 with respect to the diagonal D2, may be evaluated jointly. Regarding FIGS. 2A and 4 this may mean that the output signals of the Hall elements B, C for the determination of the precise posture of the permanent magnet arrangement 2200 with respect to the reference posture (fine resolution) and the output signals of the Hall elements b, c for the determination of the value, which may indicate the number of repeating linear displacements, may be evaluated jointly and/or or at the same time.

The same may hold for the evaluation of the output signals of the Hall elements A, D and/or a, d.

The diagonal D1 of the measurement substrate 2300, which may extend perpendicular to the diagonal D2, when seen in the direction perpendicular to the measurement substrate 2300, may be congruent with the symmetry axis of the permanent magnets 2201, 2202, which may extend in the movement direction BR. Stated otherwise, the plane, in which the symmetry axis of the permanent magnets 2201, 2202, which may point in the movement direction BR, and the diagonal D1, which may extend perpendicular to the diagonal D2, may run, may be perpendicular to the measurement plane.

If the permanent magnet arrangement 2200 in FIG. 4 moves in said one direction or in said direction that is opposite to this, there may result a change/pole reversal of the magnetic field that is experienced by the Wiegand module 1100. This change of the magnetic field may lead to the already explained abrupt change of the orientation of the domains of the Wiegand wire 1101 as from a specific amplitude of the magnetic field, and thus to the generation of the voltage pulse by the coil of the Wiegand module 1100. Due to the formation of the Wiegand wire 1101 from magnetically soft and magnetically hard sections, the triggering of the voltage pulse may occur in such different positions of the permanent magnet arrangement 2200 (first and second position), that an inference as to the movement direction BR of the permanent magnet arrangement 2200 and the alignment of the determined permanent magnets 2201 or 2202 can be drawn from the output signals of the Hall elements b, c and/or a, d in the normal case.

If the permanent magnet arrangement 2200 moves, for example, in the positive direction shown in FIG. 4, the Hall elements b, c may be located above the north pole and the south pole of the permanent magnet 2201 (first position) upon triggering of the voltage pulse, whereas in this state the Hall elements a, d may be located approximately between the permanent magnets 2201, 2202 and accordingly may output no or very small output signals.

Figure 5:
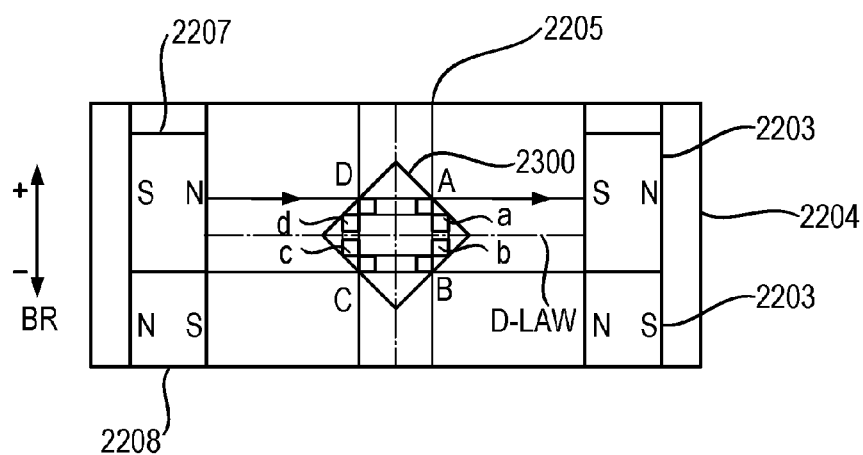
FIG. 5 illustrates a preferred implementation of the absolute position sensor according to the second preferred embodiment.

FIG. 5 shows a preferred embodiment of the absolute position sensor according to the second preferred embodiment of the invention. The view of the FIG. 5 corresponds to a view perpendicular to a normal of the measurement substrate 2300 and/or of the measurement plane.

The FIG. 5 is an equivalent to the FIG. 3.

In this embodiment, four permanent magnets 2203, 2206, 2207, 2208 may be supported by the arms of a U-shaped back iron body 2204, wherein the back iron body 2204 may be displaceably supported linearly along the movement direction BR and relative to the measurement substrate 2300 and the Wiegand module 1100 that is not shown in FIG. 5. The back iron body 2204 may form a field concentrator 2205, which may be located below the measurement substrate 2300 in FIG. 5. The field concentrator 2205 may cause a deflection of the magnetic field, which may run between the permanent magnets 2203, 2207 and/or the permanent magnets 2206, 2208 perpendicular to the plane of the drawing. This may result in the regions of the measurement substrate 2300, in which the Hall elements A to D and a to d may be arranged, being permeated at least partially perpendicularly by the magnetic fields.

Figure 6:
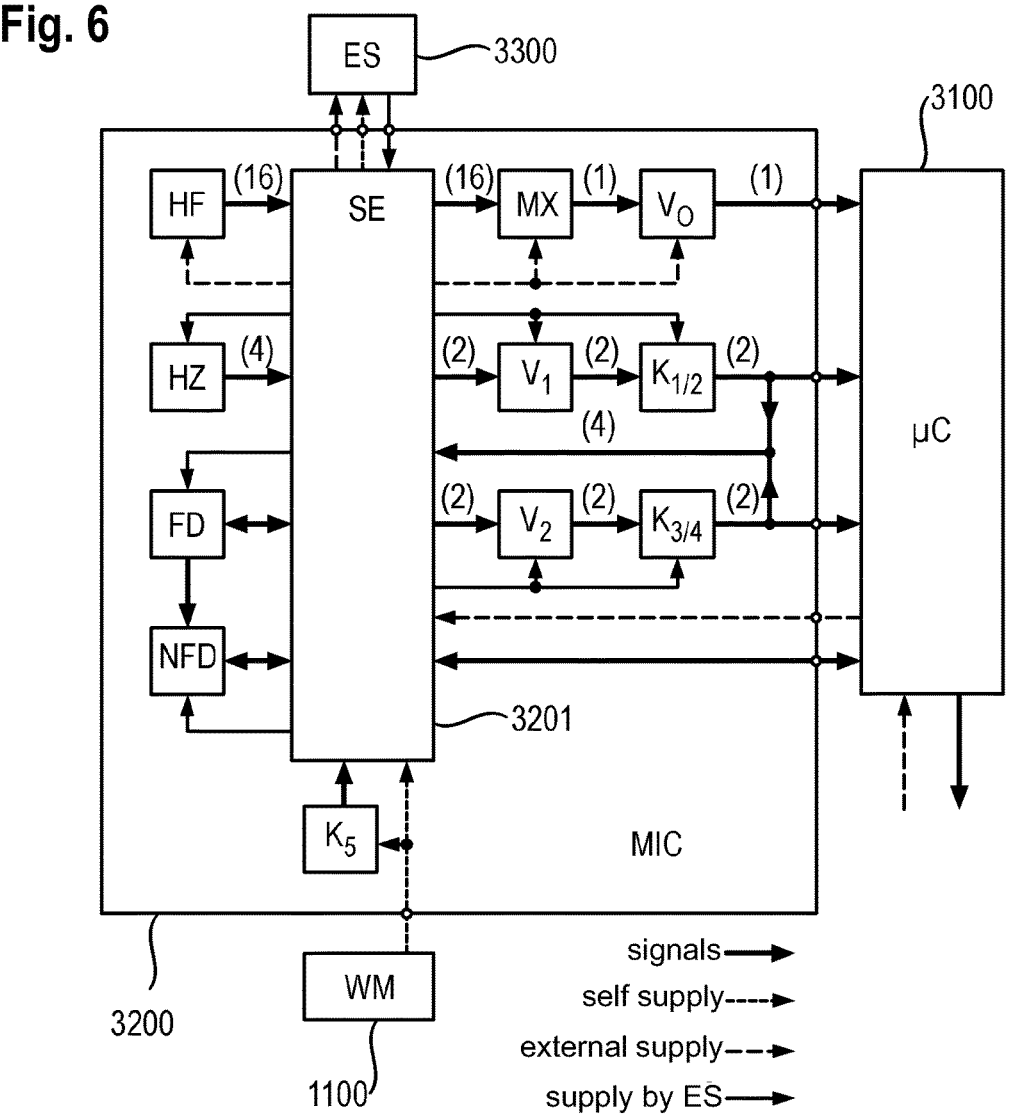
FIG. 6 illustrates the schematic construction of the total electronic, which can be applied in the absolute position sensor according to the first preferred embodiment and the second preferred embodiment.

FIG. 6 illustrates schematically the construction of the total electronic system of the absolute position sensor according to the first or the second preferred embodiment of the invention.

The total electronic system may comprise a processing electronic system 3200, which may be electrically connected to a micro-controller 3100, the Wiegand module 1100 and an energy storage 3300. All the elements, which may be contained in the square that is referenced by MIC in FIG. 6, may be located on the respective measurement substrate and form the processing electronic system. Preferably, the processing electronic system may be integrated on the measurement substrate. The Wiegand module 1100 may be arranged on a printed circuit board, on which, for example, also the measurement substrate 3200, the energy storage 3300 and the micro-controller 3100 may be located.

The processing electronic system may be located completely on the measurement substrate 1300, 1300', 2300, wherein all the elements may be based on an identical integration technology. Preferably, the measurement substrate may concern a silicon substrate, on which all the elements may be realized for example in the CMOS integration technology.

In the following, the whole electronic system is described based on the assumption that the position sensor comprises a measurement substrate having four Hall elements A to D for the fine resolution and four Hall elements a to d for the determination of the value, which indicates the number of turns and/or linear displacements.

In FIG. 6, the shortly dashed lines/arrows symbolize the course of the self-energy supply, the longly dashed lines/arrows symbolize that of the external energy supply, the thinly drawn lines/arrows symbolize the course of the supply by the energy storage 3300, and the thickly drawn lines/arrows symbolize the course of the signals.

The position sensor according to the first and second preferred embodiment may be operated either in a non-autonomous mode, in which the position sensor is supplied with external energy, or in an autonomous mode, in which the position sensor is supplied with energy that is stored in the energy storage 3300.

The processing electronic system 3200, which may be arranged on the measurement substrate 1300, 1300', 2300, may include a control electronic SE, which may be connected to the Hall elements (A to D) HF for the fine resolution and via a multiplexer MX to a first amplifier V0.

(Non-Autonomous Mode)

In the non-autonomous mode, the external energy supply may be effected via the micro-controller 3100, which may be electrically connected to the control electronic SE for this purpose. The control electronic SE in turn may supply the Hall elements HF, the multiplexer MX and the first amplifier V0 with the received external energy, and, moreover, may charge the energy storage ES, which may preferably be composed of one or more capacitors, with the external energy.

In the non-autonomous mode, the control electronic SE may receive 16 signals from the Hall elements A to D, which may be each provided with two current contacts and two Hall voltage contacts in this variant of the electronic system shown in FIG. 6. The 16 signals may result from the fact that the Hall elements A to D may be operated in a "spinning current" method, in which both the current contacts and the Hall voltage contacts may be inverted once for each Hall element, and also the polarity thereof may respectively be changed once. Insofar, four output signals may result, which may be transferred to the control electronic SE, for each Hall element.

The control electronic SE may output the 16 signals to the input of the multiplexer MX, which may connect through the received signals in sequence, respectively selectively, to its output and via a single line to the first amplifier V0.

The first amplifier V0 may amplify the received signal and may output this after amplification to the micro-controller 3100. In this state, the signal may still be an analog signal, wherein the micro-controller 3100 may convert the signal from analog to digital, and may receive 16 signals again via a demultiplexer for further processing.

The micro-controller 3100 may be capable to calculate, on the basis of the received signals, the precise posture of the permanent magnet arrangement with respect to a reference posture, i.e. in the case of the position sensor 1000 of the first preferred embodiment the angular posture of the permanent magnet 1201 and in the case of the position sensor 2000 of the second preferred embodiment the degree of the linear displacement of the permanent magnet arrangement 2200.

The four additional Hall elements a to d, which are referenced by HZ in FIG. 6, may be supplied with energy from the energy storage ES. Because at least in the autonomous mode, the energy storage ES may be charged with external energy, the Hall elements HZ may be indirectly supplied with the external energy.

The four Hall elements HZ may output four output signals thereof to the control electronic SE, which may process the respective two output signals of the pairs of the Hall elements according to the difference principle and thus may obtain in result one signal for each pair of Hall elements.

The two signals, which may have been obtained in result for both pairs, may be output block-wisely via a second amplifier V1 to two comparators K1/K2 and block-wisely via a third amplifier V2 to two comparators K3/K4. Two of the comparators may perform a comparison with a negative voltage threshold, and the other two of the comparators may perform a comparison with a positive voltage threshold, such that each signal, which may have been obtained in result according to the difference principle, may be compared with a positive and with a negative voltage threshold.

The four obtained output signals of the comparators K1 to K4 may, on the one hand, be delivered back to the control electronic SE and, on the other hand, may be output to the micro-controller 3100. The four output signals obtained from the comparators K1 to K4 may allow an interpretation to the effect, in which posture with respect to the reference posture the permanent magnet arrangement 1200 is located and/or how the magnetic poles are oriented. The continuous evaluation of the sequentially occurring output signals of the Hall elements may allow also an inference as to in which direction the permanent magnet arrangement 1200 (clockwise direction or counter-clockwise direction) or 2200 (linear displacement in positive or negative movement direction) moves. From this, the value of repeating motion sequences (revolutions or number of complete linear displacements) of the permanent magnet arrangement can be determined.

This determination may be effected, on the one hand, in the micro-controller 3100, which may determine from this value and the obtained precise posture of the permanent magnet arrangement (angular position or degree of linear displacement) the absolute position of the permanent magnet arrangement and may output this to an application, and, on the other hand, in the control electronic SE, which may store this value in a volatile data memory FD and/or in a non-volatile data memory NFD.

The four Hall elements HZ, the amplifiers V1, V2, the four comparators K1 to K4 as well as the data memories (volatile data memory FD and non-volatile data memory NFD) may also be supplied with energy from the energy storage 3300.

The volatile data memory FD may be, for example, a register that may be based on the CMOS technology. The non-volatile data memory NFD may be, for example, an EEPROM, that may also based on the CMOS technology. Both memories may particularly be implemented such that they still operate and obtain their memory values at temperatures of over 140° C., in particular at 160° C., without problems.

(Autonomous Mode)

In some applications, the case may occur, where the external energy supply breaks down or is temporarily not available. In these situations, the precise posture (or position) of the permanent magnet arrangement, i.e. the angular posture or the degree of the linear displacement, may be of subordinary importance. However, in these situations, care must be taken that the value, which may indicate the number of repeating motion sequences (turns or number of complete linear displacements), may be continuously sampled and may be stored, so that the value is available again upon re-establishment of the external energy supply.

If the external energy supply breaks down and/or is not available, the four Hall elements HF, the multiplexer MX and the amplifier V0 may not be operated.

In the autonomous mode, the Wiegand module 1100, which may provides voltage pulses with a frequency as a function of the velocity of the permanent magnet arrangement, may take over the energy supply.

In the autonomous mode, the control electronic SE may take over the control and the management of the energy supply of the processing electronic system, for example by rectifying the voltage pulses provided from the Wiegand module 1100 and outputting these for charging the energy storage ES.

Initially after a discontinuation of the external energy supply, the energy storage ES may be charged completely or very strongly.

In the autonomous mode, the energy storage ES may supply the Hall elements HZ, the amplifiers V1/V2, the comparators K1 to K4, the data memories FD/NFD and may be discharged by the corresponding energy consumption in the autonomous mode. As has already been explained, the Wiegand module 1100 may provide the voltage pulses, which may be used for charging the energy storage ES.

The determination of the value, which may indicate the number of repeating motion sequences (turns, or complete linear displacements), may be effected similarly as in the non-autonomous mode by evaluation of the output signals of the comparators. What is different is just that the output signals of the Hall elements and thus of the comparators may be effected only, when/if a voltage pulse of the Wiegand module is determined. The determination as to whether a voltage pulse is present or not, may be performed via a comparator K5, which is to be explained in the following.

As has been explained already in detail in the preceding, the voltage pulse of the Wiegand module 1100 may be triggered as a function of the direction, in which the permanent magnet arrangement moves, when the north pole or the south pole of the permanent magnet arrangement is located at the first or at the second position. Accordingly, both the alignment of the permanent magnet arrangement and also the movement direction thereof can be determined from the output signals of the comparators K1 to K4. On the basis of this, the value, which may indicate the number of repeating motion sequences, may be determined and may be stored in the volatile memory.

Understandably, an output to the micro-controller may not be effected.

In the autonomous mode, the case may occur, where the motion sequences of the permanent magnet arrangement proceed so slowly, that the danger exists, to loose the value, which is stored in the volatile data memory FD. In order to prevent the loss of data, the value, which may be stored in the volatile memory, may be transferred to the non-volatile data memory NFD.

In the autonomous mode, as long as sufficient energy is available, i.e. the energy storage ES is charged sufficiently, the value of repeating motion sequences may be stored exclusively in the volatile data memory FD. Insofar, in the autonomous mode, a very strong protection of the non-volatile data memory NFD may be effected regarding the possible memory cycles that are available.

A threshold value, which can be compared with the energy that may be contained in the energy storage, may serve for the decision as to whether the determined value has to be transferred to the non-volatile data memory NFD or may further remain and/or be kept in the volatile data memory FD. A comparator (not shown), which may preferably be located in the control electronic SE and which may compare, for example, a voltage provided from the energy storage with a voltage threshold, may serve for this comparison. If the stored energy falls below the threshold value, the determined value may have to be transferred to the non-volatile memory NFD.

Alternatively, a time duration after the occurrence of a voltage pulse and/or the time duration, which may have passed since the last voltage pulse, may be used in this respect. If this time duration exceeds a specific time duration limit, this may mean, that the energy stored in the energy storage 3300 is equal to the threshold value or falls below the threshold value, but may be just sufficient, in order to transfer the value from the volatile data memory to the non-volatile data memory.

For the determination as to whether a voltage pulse is present or not, the processing electronic system may include a comparator K5, which may be connected to the output of the coil of the Wiegand module 1100 and may be supplied therefrom. The comparator K5 can determine, whether the Wiegand module or the coil thereof provides a processable voltage pulse.

Stated otherwise, the time duration limit may be a time period between the occurrence of a signal from the comparator K5 and the point in time, at which the value, which is held in the volatile data memory, must be transferred to the non-volatile data memory. The time duration limit may have a significant influence on the lifetime of the non-volatile data memory. The less consumers the Wiegand module has to supply, the longer is the time duration limit.

In order to increase the time duration limit, the processing electronic system 3200 may preferably be configured such that it switches on those electronic elements, which may be necessary for the determining and storing of the value in the volatile data memory, only, if the presence of a voltage pulse of the control electronic is signalled by the comparator K5. In particular, the two amplifiers V1, V2, the Hall elements and the comparators K1 to K4 as well as parts of the control electronic except for those used to recognize the signals from the comparator K5, may be counted among these electronic elements. After the storing of the value, the processing electronic system may switch off these electronic elements again.

Exemplary calculations have shown that the time duration limit for a corresponding dimensioning of the processing electronic system can be at about 5 ms. This may correspond to a frequency limit of the repeating motion sequence of the permanent magnet arrangement of 100 Hz. This may mean that as long as the time duration between two consecutive voltage pulses is less than 5 ms, the accordingly determined value may have to be stored in the volatile data memory FD only.

Because applications may exist, in which external energy is available for most of the time and in which even in the case of a breakdown of the external energy supply the frequency of repeating motion sequences is very high, the volatile data memory FD may be implemented preferably such that it makes available at least n=40 bit for the determined value. This may correspond to a determined value of $10^{12}$. Including reserve bits and control bits, the total number of the bits that are made available by the volatile memory FD may be close to n=100.

If in a certain application the threshold value or the frequency limit is undershot and/or the time duration limit is exceeded, these 100 bits may be transferred from the volatile data memory FD to the non-volatile data memory NFD.

In order to increase the number of possible write cycles of the non-volatile data memory NFD, the latter may be implemented preferably such that it comprises m memory blocks each having n bits. The number of the m memory blocks may amount preferably to m=1000.

The control electronic SE may be implemented such that it can determine malfunctions of a memory cell, which [cell] may correspond to one of the n bits, of the non-volatile data memory NFD. As long as the control electronic SE determines no malfunction of a memory cell of the presently used m-th memory block, the value, which may be stored in the volatile data memory FD, may preferably be transferred to one single selected memory block of the m memory blocks upon undershooting of the threshold value and/or the frequency limit or upon exceeding the time duration limit.

On the contrary, if a malfunction of a memory cell of the presently used m-th memory blocks is determined, the control electronic may change over the memory block that is used in the non-volatile memory to a memory block that is not yet used and/or is operable.

The non-volatile memory NFD can be implemented for example such that it allows $10^9$ memory cycles for each memory cell, before the corresponding memory cell shows a malfunction. From this it can be determined, that even in the case of applications, where the time duration limit is never undershot and the first malfunction occurs after $10^9$ memory cycles, sufficiently high numbers of memory cycles may be possible due to the m-fold multiplication of the necessary n bits.

In order to further increase the possible memory cycles of the total non-volatile memory, the control electronic can alternatively be configured not to change the total memory block immediately in the case of a single malfunction, but to replace only the memory cell, which has the malfunction, by a reserve memory cell and/or to replace only the corresponding bit by a reserve bit. A change of the total memory block may be effected by the control electronic only, if a [e.g. specified] number of memory cells/bits of the used memory block shows a malfunction and has been replaced by corresponding reserve memory cells/reserve bits.

As can be seen from the preceding description, the invention may make available an absolute position sensor, which may allow for sufficient memory cycles in the non-volatile data memory and which may not have the disadvantages of the FRAM technology.

The invention claimed is:

1. Absolute position sensor comprising:
   a Wiegand module, which is composed from a Wiegand wire with a coil that surrounds the Wiegand wire;
   a measurement substrate, which defines a measurement plane, and which comprises a plurality of Hall elements, wherein the Hall elements are arranged on the measurement substrate such that their active areas, which are sensitive to a magnetic field, extend in the measurement plane or form a part of the measurement plane;
   a permanent magnet arrangement, which is movable in a movement plane, which is parallel to the measurement plane, relative to the Wiegand module and to the measurement substrate in one direction as well as in a direction that is opposite to said one direction, wherein
   upon a movement of the permanent magnet arrangement in said one direction, the coil of the Wiegand module generates a voltage pulse, if a north pole or a south pole of the permanent magnet arrangement is located at a first position, and upon a movement of the permanent magnet arrangement in said opposite direction, the coil of the Wiegand module generates the voltage pulse, when the north pole or the south pole of the permanent magnet arrangement is located at a second position that is different from the first position;
   a micro-controller; and
   a processing electronic system, which is arranged on the measurement substrate and which comprises at least a control electronic, a volatile data memory and a non-volatile data memory as well as the Hall elements, which are realized in a common integrated circuit on the basis of identical integration technology; wherein
   the control electronic is configured
   (i) in a non-autonomous mode, in which the position sensor is supplied with external energy, to deliver output signals of a group of the Hall elements to the micro-controller for determining a precise position of the permanent magnet arrangement with respect to a reference position, and to determine a value, which corresponds to a number of repeating motion sequences of the permanent magnet arrangement, for storing in the volatile or non-volatile data memory either on the basis of an output signal of at least one of the Hall elements or to obtain such a value from the micro-controller, and
   (ii) in an autonomous mode, in which no external energy is available and the position sensor is supplied with energy, which is provided from the Wiegand module, to determine the value, which corresponds to the number of repeating motion sequences of the permanent magnet arrangement, on the basis of an output signal of at least one of the Hall elements as well as to store the value in the volatile data memory, and to transfer the value, which is stored in the volatile data memory, to the non-volatile data memory, if the energy that is available in the autonomous mode falls below a threshold value.

2. Position sensor according to claim 1, wherein the identical integration technology is a CMOS integration technology.

3. Position sensor according to claim 1, wherein the volatile data memory is a register and the non-volatile data memory is an EEPROM.

4. Position sensor according to claim 1, wherein
   the volatile data memory comprises n bits and the non-volatile data memory comprises m memory blocks, each having at least n bits; and
   the processing electronic system is configured to transfer the stored value from the volatile data memory to one of the m memory blocks and to change said one of the m memory blocks.

5. Position sensor according to claim 4, wherein the processing electronic system is configured to transfer the stored value from the volatile data memory to one of the m memory blocks so long, until an examination of said one of them memory blocks yields that at least one memory cell, which corresponds to one of the n bits, of the memory block has a malfunction and to subsequently change over said one of the m memory blocks.

6. Position sensor according to claim 4, wherein the processing electronic system is configured to perform an examination of said one of the m memory blocks to the effect whether at least one memory cell, which correspond to one of the n bits, of one of the m memory blocks has a malfunction, and subsequently to replace the memory cell, which has the malfunction, by a reserve memory cell of said one of the m memory blocks, and to change over said one of the m memory blocks, if a specified number of memory cells of the storage blocks has the malfunction.

7. Position sensor according to claim 1, wherein the processing electronic system is configured to determine a presence and an absence of the voltage pulse of the Wiegand module, and to switch on at least those electronic elements, which are necessary for the determination and the storage of the value, which corresponds to the number of repeating motion sequences.

8. Position sensor according to claim 7, wherein the processing electronic system is configured to switch off again those electronic elements after the storing of the value, which corresponds to the number of repeating motion sequences.

9. Position sensor according to claim 1, wherein the processing electronic system is configured to transfer the value, which is stored in the volatile data memory, into the non-volatile data memory, if a time period after the occurrence of the voltage pulse exceeds a time period limit.

* * * * *